United States Patent [19]

Saggers

[11] Patent Number: 4,787,413

[45] Date of Patent: Nov. 29, 1988

[54] PRESSURE CONTROL VALVE

[76] Inventor: Michael J. Saggers, 9 Pennycroft, Harpenden, Hertfordshire, England

[21] Appl. No.: 940,381

[22] Filed: Dec. 11, 1986

[30] Foreign Application Priority Data

Dec. 11, 1985 [GB] United Kingdom ................ 8530515

[51] Int. Cl.[4] ............................................ G05D 16/06
[52] U.S. Cl. ...................................... 137/494; 251/61; 251/243; 251/285
[58] Field of Search ................. 137/494, 495, 530, 86; 251/61, 243, 235, 285; 128/204.28, 205.24

[56] References Cited

U.S. PATENT DOCUMENTS

| 1,753,536 | 4/1930 | Scovel | 137/494 |
| 2,521,166 | 9/1950 | Hinrichs | 137/530 |
| 2,800,136 | 7/1957 | Bowditch | 137/86 X |
| 2,915,078 | 12/1959 | Ochs | 137/85 |
| 3,044,446 | 7/1962 | Vanderhoven | 251/243 X |
| 3,263,696 | 8/1966 | Robins | 137/86 |
| 3,451,421 | 6/1969 | Vicenzi et al. | 137/495 |
| 3,511,472 | 5/1970 | Zimmerman | 251/285 |
| 3,580,502 | 5/1971 | Duchek | 137/82 |
| 3,845,783 | 11/1974 | De Lepeleire | |
| 3,853,143 | 12/1974 | De Lepeleire | |
| 4,336,918 | 6/1982 | Karbo | |
| 4,365,846 | 12/1982 | Schopper et al. | 251/235 |

FOREIGN PATENT DOCUMENTS

| 537944 | 7/1959 | Belgium | 137/494 |
| 586299 | 3/1925 | France | 128/204.28 |

Primary Examiner—Martin P. Schwadron
Assistant Examiner—Stephen M. Hepperle
Attorney, Agent, or Firm—Banner, Birch, McKie & Beckett

[57] ABSTRACT

A pressure control valve (10) comprises a first element (14) arranged to pivot relative to a second element (18) in response to inflation and deflation of a sac (16) interposed between the elements, the second element having a fluid passageway (32, 34) including an outlet (32a) which is controlled by said first element by virtue of its pivotal movement, said fluid passageway communicating with said inflatable sac, means (30) being provided to adjust and limit the pivotal action of the first element.

4 Claims, 2 Drawing Sheets

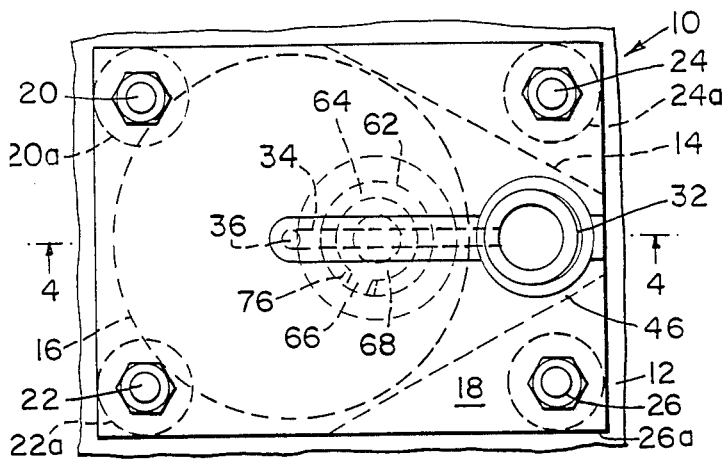
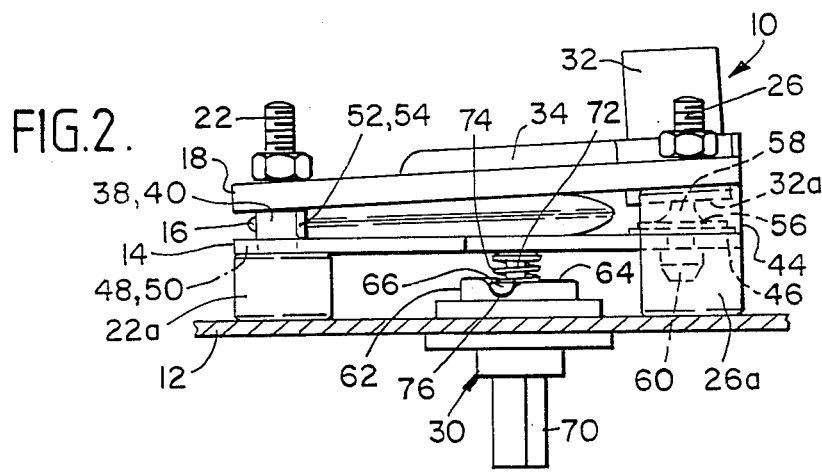
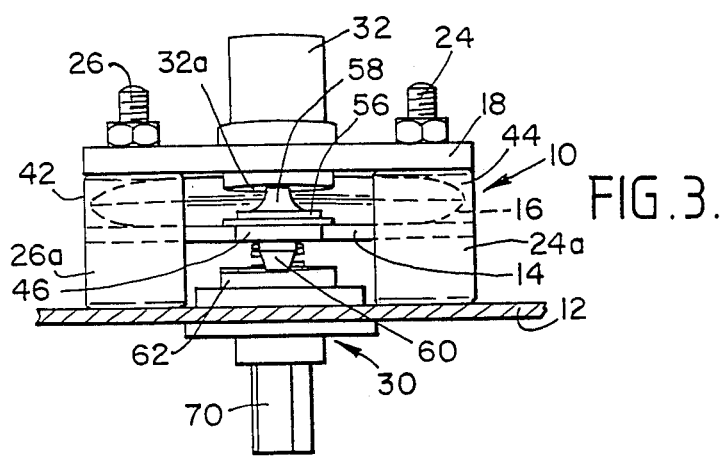

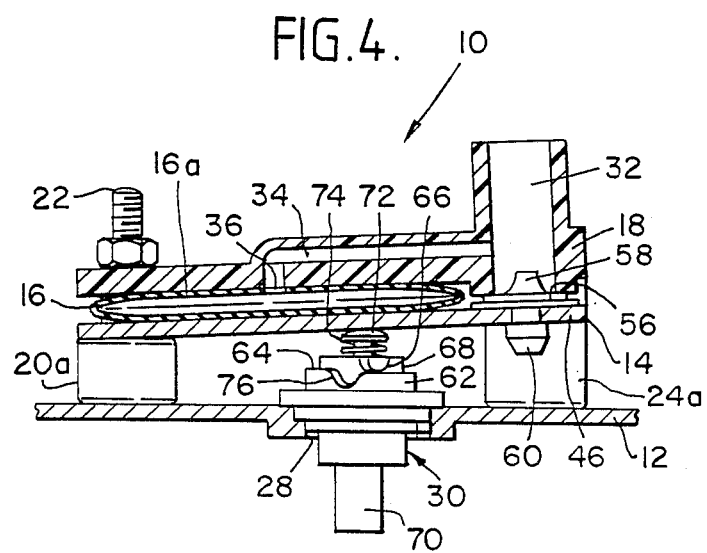

PRESSURE CONTROL VALVE

This invention relates to a pressure control valve particularly, although not exclusively, for use in a pneumatic apparatus for the so-called intermittent compression therapeutic treatment of the body.

In such application, a pressure control valve according to the present invention controls the supply pressure of pressurized fluid, normally air, from a source of pressurized fluid to one or more inflatable garments. The garments typically comprise a sealed double-skinned sleeve which more usually is worn about a patient's limb to be treated and which cylically is inflated and deflated so as to apply an intermittent compressive force to that limb.

In order to provide for variability of the compressive force, a valve of the present invention is interposed in a fluid circuit between the source of pressurized fluid e.g. a pneumatic pump, and the or each garment and is adjustable to alter the pressure of fluid supplied.

One aspect of the present invention provides a pressure control valve comprising a first element arranged to pivot relative to a second element in response to inflation and deflation of a sac interposed between the elements, a second element having a fluid passageway including an outlet which is controlled by said first element by virtue of its pivotal movement, said fluid passageway communicating with said inflatable sac, means being provided to adjust and limit the pivotal action of the first element.

Another aspect of the present invention provides a pressure control valve comprising a passageway communicating a fluid inlet and a fluid outlet of the valve one with the other, an inflatable chamber communicating with said passageway so as to receive pressure fluid therefrom to inflate the chamber, closure means being arranged to open and close the passageway in response to inflation and deflation of the chamber against a preset loading applied by said closure means, characterized in that said passageway comprises a further inflatable chamber upon which said closure means acts.

A pressure control valve embodying the invention will now be described, by way of example, with reference to the accompanying drawings, in which:

FIG. 1 is a plan view of a pressure control valve according to the invention;

FIG. 2 is a side elevation of the pressure control valve;

FIG. 3 is an end elevation of the pressure control valve; and

FIG. 4 is a cross-sectional view taken on the line 4—4 in FIG. 1.

Referring to the drawings, a pressure control valve 10 comprises a base plate 12; a pivotal plate 14; an inflatable sac 16 and a top plate 18 superposed in series. Thus, the pivotal plate 14 is disposed intermediate base plate 12 and top plate 18 and the inflatable sac is interposed between the pivotal plate 14 and top plate 18.

The base plate 12 (which may be the wall of a casing in which the valve is housed) is provided with four upstanding screw-threaded posts 20–26, the lower portion of each post being fitted with a resilient cuff 20a–26a, respectively, formed e.g. of rubber. Within the four corner posts base plate 12 is formed with an opening in which is seated a pressure setting control 30 which is described later.

Adjacent one end of top plate 18 between posts 24 and 26 the top plate is formed with a through duct 32. A smaller diameter branch duct 34 extends through the top plate and communicates with the inflatable sac 16. For this purpose, the sac 16 is formed with a central aperture 36 in its top skin 16a. At each of its corners the top plate is provided with downwardly depending legs 38–44 of which the legs of one pair, 42 and 44 are of larger diameter than the legs of the other pair 40, 42. Each of the legs are drilled so that the top plate can be fitted onto the corner posts which pass through the legs 38–44.

The pivotal plate 14 is convergent towards one of its ends thereby forming a nose portion 46, the convergent edges of which pass between the posts 24, 26 and the legs 42, 44. The lower faces of the legs 42, 44 seat on the upper faces of the resilient cuffs 26a, 24a, respectively. At its opposite end, pivotal plate 14 is provided with spaced apertures 48, 50 through which the legs 40, 42 of top plate 18 pass the lower faces of which seat on the upper faces of resilient cuffs 20a, 22a, respectively.

Adjacent and parallel to the legs 38, 40, the top plate is formed with downwardly depending pegs 52, 54 which are axial displaced with respect to legs 38, 40 towards the nose portion, 46.

The tips of the pegs 52, 54 abut the top surface of the pivotal plate. Thus, the pivotal plate is pivotal about the pegs 52, 54 in response to inflation and deflation of the sac 16 so that the nose portion is moved respectively away from and towards the mouth of the through duct 32 at the underside of top plate 18, while the opposite end of the pivotal plate resiliently is seated on the elastomeric cuffs 20a and 22a.

The upper face of the pivotal plate is furnished with a sealing element 56 which seats against the adjacent mouth of the through duct 32. The sealing element has a central frusto-conical projection 58 which enters the through duct as the nose portion 46 is pivoted towards the duct. The sealing element not only provides a seal at the mouth of the duct when the nose portion is remote from base plate 12 but the particular configuration allows smooth control of the airflow exhausted through the duct and quiet operation of the valve. A resilient stop 60 is provided on the underside of the pivotal plate to prevent the emission of noise when the nose portion of the pivotal plate pivots away from the through duct. The sealing element and duct preferably are integrally joined by a bridging piece which extends through an aperture formed in the nose portion.

In order to control pivotal movement of the plate 14, pressure setting control 30 comprises a fixed annular stem 62 whose upper surface is formed to provide a spiral cam surface 64. The stem may be integral with base 12. A follower 66 is carried at an enlarged end 68 of a rotatable control shaft 70 which passes through the annular stem such that the follower is slidable on the spiral cam surface as the control shaft is rotated. An end-piece 72 projecting from the enlarged end 68 engages against the underside of the pivotal plate intermediate its ends and carries a helical spring 74 located to bias the follower 66 into enlargement with the cam surface 64.

In use, the control valve is introduced into a fluidic e.g. pneumatic circuit by connecting the through duct 32 to a conduit through which an air stream whose pressure it is desired to control is to flow. Air passes into the through duct and via branch duct 34 inflates the sac 16 by an amount determined by the position of the pivotal plate. The position of the pivotal plate 14 is adjusted by rotating the shaft 70 of the pressure setting control 30 thereby to pivot the plate so that the sealing element is positioned relative to the duct mouth 32a in order to allow the passage of a greater or lesser amount of air from the through duct. Of course, the more air which is allowed to be emitted from through duct 32 the less is the pressure to which the pneumatic circuit is subjected and vice versa.

In some applications it is desirable to provide a rapid exhaust path for the air in a fluid circuit.

To this end, the annular stem 62 of the pressure setting control 30 may be provided with a cut-out 76 into which the cam follower 66 can drop thereby causing pivoting of the plate 14 such that the mouth of the through duct is unrestricted as shown e.g. In FIG. 2.

It is also envisaged that the sensitivity of the control valve may be altered by incorporating a restriction in the branch duct 34. For example, a screw-threaded element could be introduced into the branch duct to restrict the amount of air transferred from the through duct to the inflatable sac.

In the construction described the air which issues from the mouth of the through duct passes in atmosphere. However, it is envisaged in some applications that this exhausted air could be transferred and utilized as a pneumatic signal e.g. to operate a switch. In such a modified construction a further inflatable sac could be secured to the mouth 32a of the through duct to receive air exhausted therefrom. The nose portion 46 of pivotal plate 14 in this arrangement would then act against the further inflatable sac but in other respects the construction and operation is as previously described. A transfer conduit communicating with the further inflatable sac would be provided to transfer air exhausted into the sac along to a point of application. For convenience the inflatable sac 16 and the further inflatable sac may be joined together and formed as a single element with two side by side inflatable compartments.

I claim:

1. A pressure control valve for adjusting the pressure of fluid flowing in a conduit comprising:
   (a) first and second plates mounted together in superposed relationship on a common base;
   (b) an inflatable sac interposed between said plates;
   (c) a pivotal support connecting said plates together and providing pivotal movement for said first plate relative to said second plate in response to inflation and deflation of said sac;
   (d) a fluid passageway incorporated in said second plate remote from said pivotal support and having an axis perpendicular to a plane containing said second plate and providing a fluid inlet for coupling to a conduit having a pressurized flowing fluid and a fluid outlet;
   (e) means provided by said first plate to control fluid flow from said outlet by opening and closing said outlet in said second plate in response to pivotal movement of said first plate with respect to said second plate;
   (f) a branch duct formed integrally with second plate and interconnecting said fluid passageway and said inflatable sac so that pressurized fluid from the pressurized flowing fluid can be transferred therebetween; and
   (g) pressure setting control means acting on said first plate for adjusting the pivotal movement of the first plate and thereby adjusting the opening and closing of said fluid outlet to control the pressure of the pressurized flowing fluid, said pressure setting control means comprising a follower slidable with respect to a spiral cam surface, said spiral cam surface being located on a face of said common base facing said first plate, and said follower being connected to a rotatable shaft extending from the opposite face of said base wherein adjustment of the position of said follower on said spiral cam adjusts the amount said first plate is pivotable relative to said second plate.

2. A pressure control valve according to claim 1, wherein said pivotal support includes at least one leg extending from said second plate, at least one aperture formed through said first plate, said at least one leg passing through said at least one aperture, and a fulcrum offset from said at least one leg about which said first plate is pivotal.

3. A pressure control valve according to claim 2 wherein a pair of said at least one aperture are formed through said first plate, and a pair of said at least one leg extend from said second plate and through said apertures.

4. A pressure control valve according to claim 1 wherein said branch duct is formed as an integral projection from said second plate.

* * * * *